H. W. RICHARDS.
HOE.
APPLICATION FILED MAR. 24, 1908.
936,038.
Patented Oct. 5, 1909.
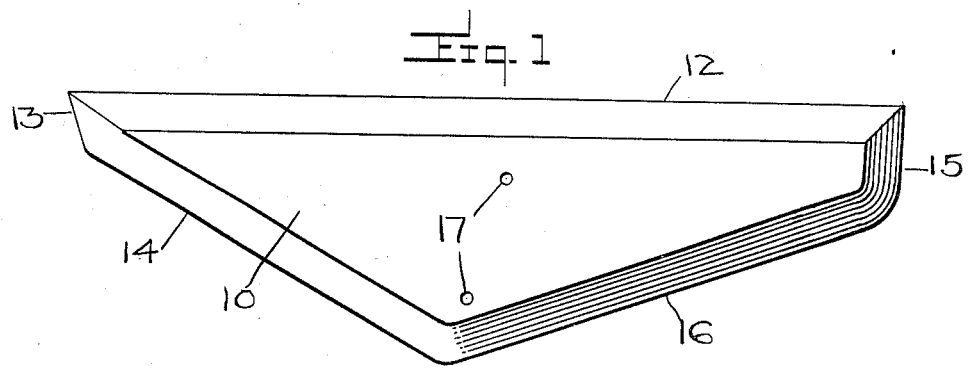
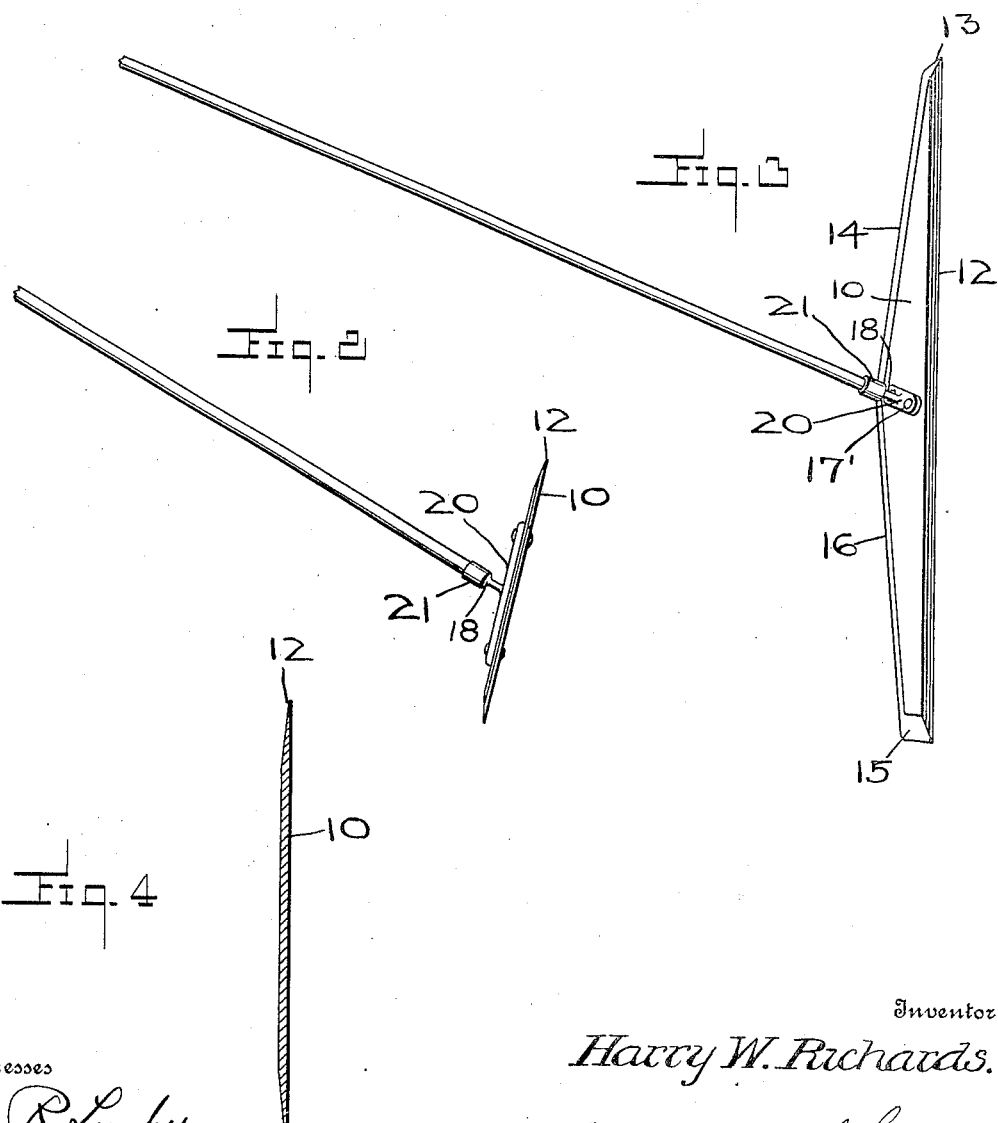
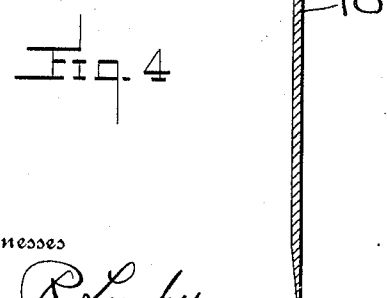
Witnesses
Ed. R. Lugby.
E. L. Chandlee
Inventor
Harry W. Richards.
By Woodward & Chandlee
Attorney

UNITED STATES PATENT OFFICE.

HARRY W. RICHARDS, OF STUART, FLORIDA.

HOE.

936,038.  Specification of Letters Patent.  Patented Oct. 5, 1909.

Application filed March 24, 1908. Serial No. 422,982.

*To all whom it may concern:*

Be it known that I, HARRY W. RICHARDS, a citizen of the United States, residing at Stuart, in the county of Dade and State of Florida, have invented certain new and useful Improvements in Hoes, of which the following is a specification.

This invention relates to farming implements, and more particularly to hoes, and has for its object to provide a hoe for operating in confined places.

Another object is to provide a hoe blade of a design peculiarly effective for use in hoeing tall weeds of heavy growth.

Another object is to provide a hoe the blade of which is secured to the handle in such a way that the disadvantage of flexing action of the shank is obviated.

Another object is to provide a hoe having various forms of cutting portions, adapted to different classes of work.

Another important object of this invention is to provide a hoe which may be used to treat all sides of a plant, the operator remaining on one side of the plant during the complete operation.

Another object is to provide a hoe which may be adjusted to be adapted to use by either a left handed or right handed person.

Another object is to provide an article which may be manufactured from stock material at low cost.

Other objects and advantages will be apparent from the following description, and it will be understood that changes in the specific structure shown and described may be made within the scope of the claim, and that any suitable materials may be used without departing from the spirit of the invention.

In the drawings forming a portion of this specification and in which like numerals of reference indicate similar parts in the several views, Figure 1 is a plan view of the hoe blade on its forward face, Fig. 2 is a side view of the hoe assembled, Fig. 3 is a top view of the hoe, Fig. 4 is a cross sectional view of the blade.

Referring to the drawings, there is shown a hoe having a blade 10 formed from a piece of sheet steel of approximately a scalene triangular shape. The blade is shaped to present a base edge 12, one end of the hoe being pointed as at 13, and having a sharpened side edge 14 extending diagonally upward and inwardly from the point. The opposite end of the blade is provided with a nearly vertical edge 15 from which extends an upwardly inclined cutting edge 16 meeting the edge 14 at an obtuse angle adjacent to the middle of the blade. The edges of the hoe are sharpened by being beveled from a common side of the blade. Centrally of the blade 10 there are formed perforations 17 spaced diagonally. A shank 18 is secured to the blade 10 adjacent to the center of gravity of the blade, the shank comprising a flat blade carrying portion 20 having perforations 17′ therethrough registering with the perforations 17, and having a handle engaging portion 21 extending outwardly therefrom and laterally at an oblique angle with relation to the plane of the blade carrying portion 20.

It will be seen that a hoe is provided which is peculiarly effective for working in confined places, such as between railroad ties or in corners, and which may be operated when necessary by being pushed forwardly without springing the blade. This use of the hoe is made possible by the laterally oblique adjustment of the handle portion of the shank with relation to the plane of the blade. By reason of the disposition of the shank adjacent to the center of mass of the blade, any edge or either end of the hoe may be used with equal facility.

What is claimed is:—

A hoe comprising a blade formed of sheet material, said blade having a horizontal base edge extending its full length, said blade having a pointed end, a second edge extending therefrom at an acute angle with relation to the first named edge to a point adjacent the middle of the blade, a top edge extending at an oblique angle downwardly therefrom, and an edge extending at an oblique angle from the last named edge and connected to the base edge at its end opposite the second named edge, said blade having central spaced perforations therethrough disposed on a line inclined from the vertical with respect to the base edge, a shank secured to the blade and comprising an oblong face having perforations therethrough registering with those in the blade, and a handle engaging shank extending therefrom and inclined laterally with respect to the blade and in line with the openings therein.

In testimony whereof I affix my signature, in presence of two witnesses.

HARRY W. RICHARDS.

Witnesses:
J. C. HANCOCK,
A. L. LANE.